Dec. 11, 1956 M. LEBEDINSKY 2,773,940

TELECOMMUNICATION STATION EQUIPMENT

Filed June 16, 1952 8 Sheets-Sheet 1

Inventor
Myron Lebedinsky
By
Henderoth, Lind & Ponack
Attorneys.

Inventor
Myron Lebedinsky
By
Henderoth, Lind & Ponack
Attorneys

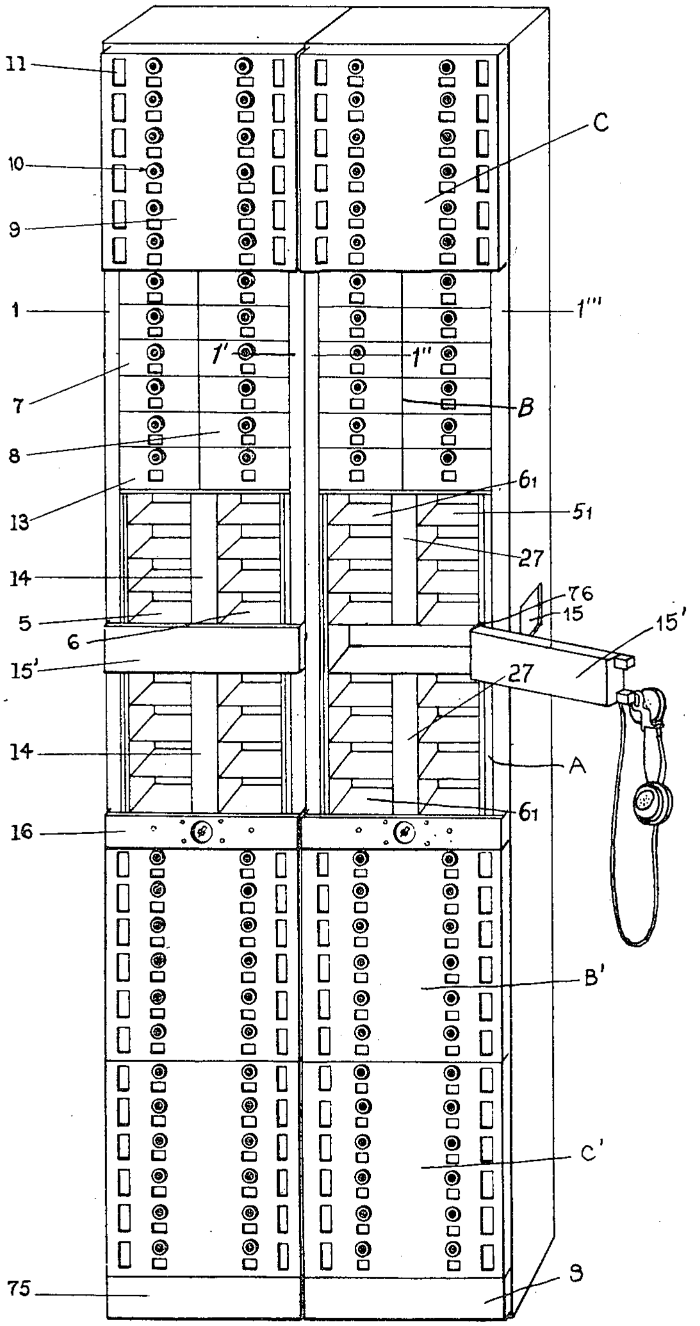
—Fig: 5—
Inventor
Myron Lebedinsky
By
Hendersoth, Lind + Ponack
Attorneys.

Dec. 11, 1956 M. LEBEDINSKY 2,773,940
TELECOMMUNICATION STATION EQUIPMENT
Filed June 16, 1952 8 Sheets-Sheet 4
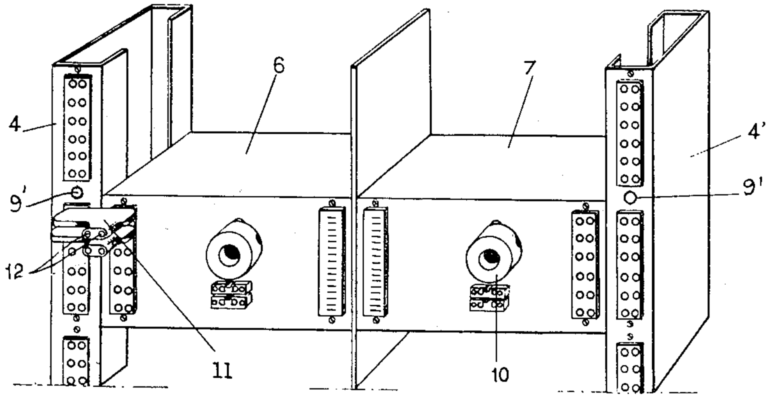
– Fig : 6a –
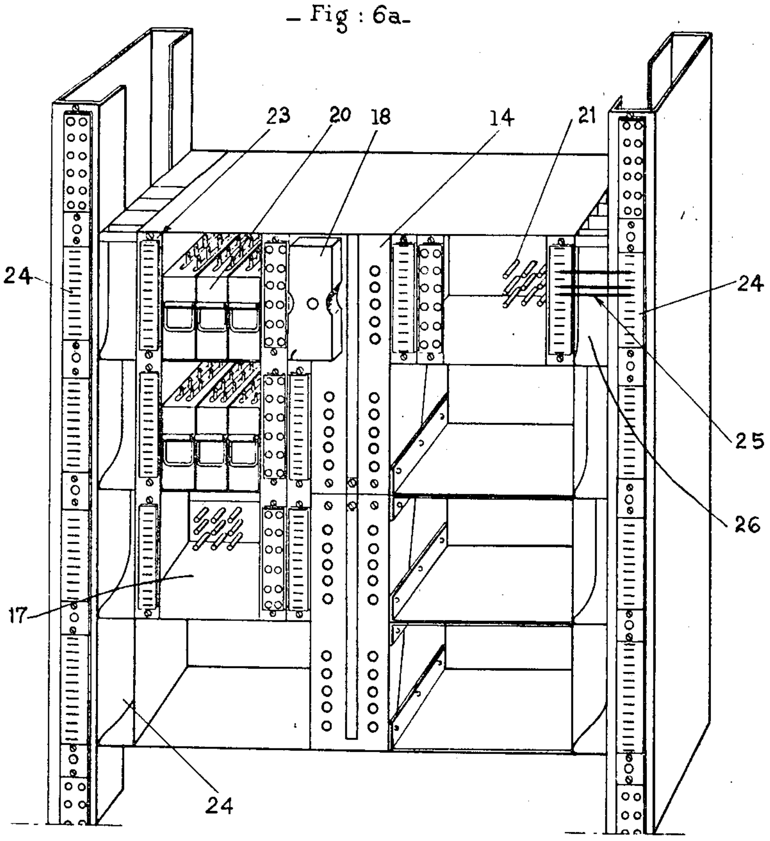
– Fig : 7 –
Inventor
Myron Lebedinsky
By
Heudeuth, Lind & Ponack
Attorneys.

Inventor
Myron Lebedinsky
By
Arendt, Lind & Ponack
Attorneys.

Inventor
Myron Lebedinsky
By
Wenderoth, Lind & Ponack
Attorneys.

— Fig : 11 —

Inventor
Myron Lebedinsky
By
Hendeuroth, Lind & Ponack
Attorneys

Dec. 11, 1956 M. LEBEDINSKY 2,773,940
TELECOMMUNICATION STATION EQUIPMENT
Filed June 16, 1952 8 Sheets-Sheet 8
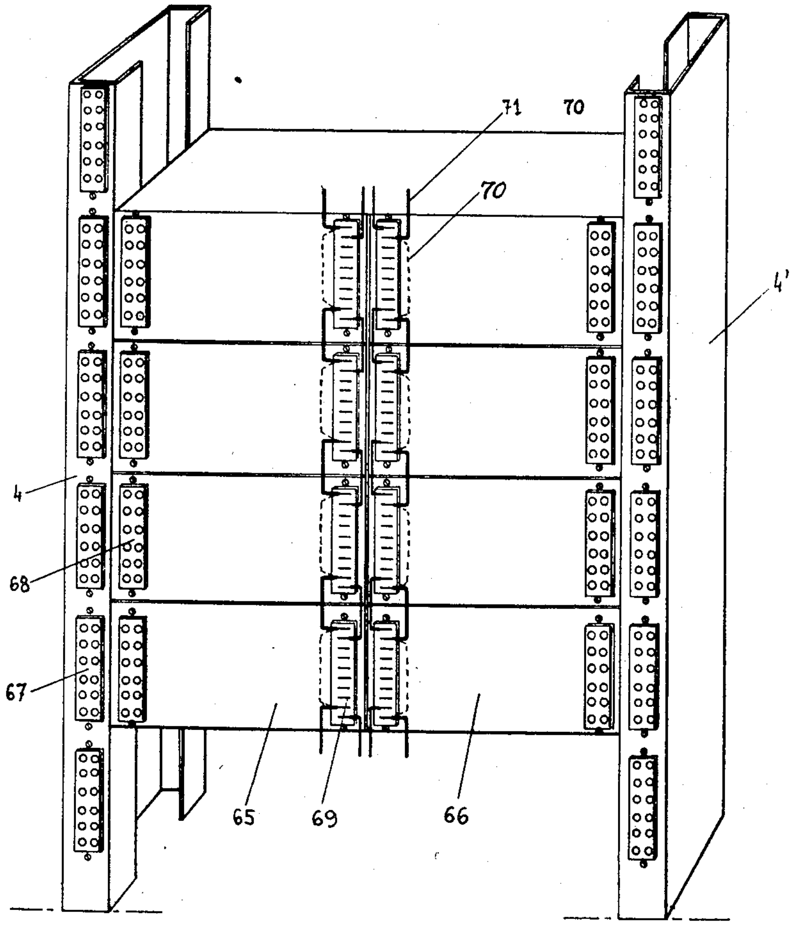
_Fig:12_
Inventor
Myron Lebedinsky
By
Kenderoth, Lind & Ponack
Attorneys United States Patent Office 2,773,940
Patented Dec. 11, 1956

2,773,940

TELECOMMUNICATION STATION EQUIPMENT

Myron Lebedinsky, Neuilly-sur-Seine, France, assignor to Societe Anonyme de Telecommunications, Paris, France, a body corporate of France Application June 16, 1952, Serial No. 293,759
Claims priority, application France June 21, 1951
6 Claims. (Cl. 179—91)

The present invention relates to the installation of telecommunication equipment in exchange and repeater stations and particularly to the racks or bays in which are mounted the various components required for the service of the transmission circuits terminating in these stations.

In stations equipped in the usual way, the underground cables, made up of a plurality of two-wire or twin circuits, assembled in pairs to form quads (over which by the use of so-called "phantom" circuits, three calls may be transmitted simultaneously), terminate on a first rack. This rack includes cable distribution terminals and units consisting of transformers and of balancing networks to separate from each quad its three circuits (two wire circuits and one phantom circuit) and lead them individually to a second rack, called main distribution frame, which carries terminating strips on which the circuits will end.

The installation includes other racks in which are mounted the components, such as the amplifiers, necessary for the service of each circuit. These racks are metal frames formed by columns or uprights, connected together by transverse members, bearing equipment boxes in which are placed parallelepiped blocks containing the sundry components and connected together by a "cable form."

The columns or uprights of the frame are generally hollow and enclose the "cable forms," i. e. the cables which connect the sundry apparatus or components on one hand with the feeding sources and on the other hand, with the main distribution frame; these cables pass through cable gutters disposed above the racks and all the connections, from one component to another or from components to cable circuits, are made on the main distribution frame, by suitable connections between the strips of this distribution frame.

Such an arrangement involves a considerable and complex cable system, both between the various racks and also in the racks.

Racks of apparatuses ready mounted and equipped with their cables are very cumbersome; their transportation is difficult and costly.

The object of the present invention is greatly to simplify telecommunication station equipments, more particularly by:

(*a*) Suppressing the rack bearing the cable distribution terminals and the rack bearing the main distribution frame;

(*b*) Suppressing the connecting wires between the rack bearing the cable distribution terminals and the main distribution frame on the one hand, and on the other hand between the main distribution frame and the racks bearing the apparatuses;

(*c*) Suppressing the racks of apparatuses forming separate units;

(*d*) Suppressing the boxes of equipment forming separate units;

(*e*) Suppressing the system of wire connections between the blocks;

(*f*) Placing all the apparatuses of a same circuit close to each other in a same row, the cable termination in which the circuits terminate being preferably arranged with these apparatuses, in the same row, so that the connections between the cable terminations and the apparatus are very short and direct and between the various apparatuses.

These improvements in the equipment are obtained in the following way: Each bay is constituted with two hollow columns or uprights which, when assembled in working position in the station, are connected together by cellular or shelf-like frames receiving the blocks of apparatus necessary for the service of the telephone circuits: a free horizontal passage or runway, accessible through two apertures in the side faces of the two columns, is provided between these shelves to receive the jumpers securing the connections between the bays: the columns enclose "formed cables," assembled for making connections between the apparatuses in the bay, and these cables terminate in strips of sockets and/or of terminals arranged on the front face of these columns and connected by means of links or of short wires soldered to the sockets and/or the terminals arranged on the blocks of apparatuses resting on the shelves.

This new arrangement offers, as compared with the arrangements used up to now, the following advantages:

The cabling to be done in the station is reduced to the soldering of short connecting wires, a simple operation;

Transport of the equipment is much easier on account of the reduced bulk and of the parallelepiped shape of the elements: blocks, compartmented shelves, uprights.

The columns, made of folded sheet iron, are hollow. Inside a column is a set of cable forms, the cables terminating in terminals and/or sockets which, in turn, are connected, by means of soldered wires and/or links with the terminals and/or the sockets of the blocks adjacent to the column. A strip of terminals is fixed on the bottom of the column and is connected by soldered wires with an identical strip, set on a fuse panel mounted on the base, under the rack, to supply current to the apparatus. This strip is entirely located in the thickness of the column. Thus it is possible to pile the columns in cases for transport without any waste place.

By way of example, an embodiment and alternate forms of the object of the invention are described hereafter and illustrated in the annexed drawing.

Fig. 5 shows a part of a row consisting of a bay with two-wire-repeaters of the "intermediate" type and of a bay of two-wire repeaters of the terminal type, with their cable terminations.

Figure 6B:
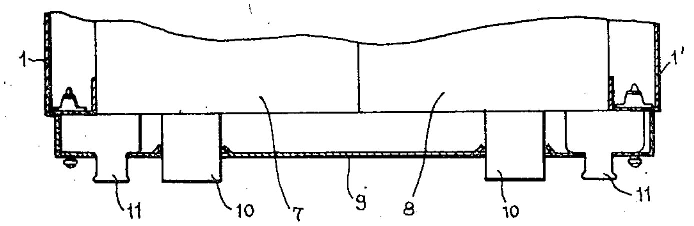

Figs. 6*a*, 6*b* illustrate one of the bays of Fig. 5, in perspective and in a horizontal section, above a repeater, respectively.

Fig. 7 shows a general view of a cable termination and of the blocks of transformers and of balancing networks units.

Figure 8:
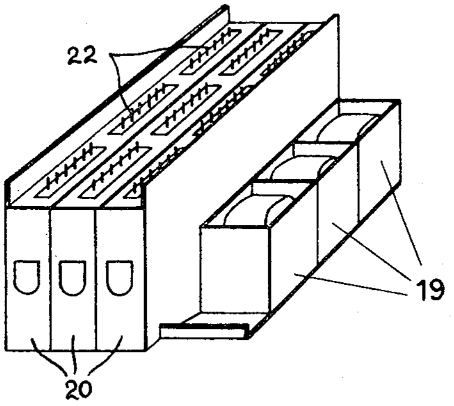

Fig. 8 illustrates a block of transformers and balancing networks units.

Figure 9:
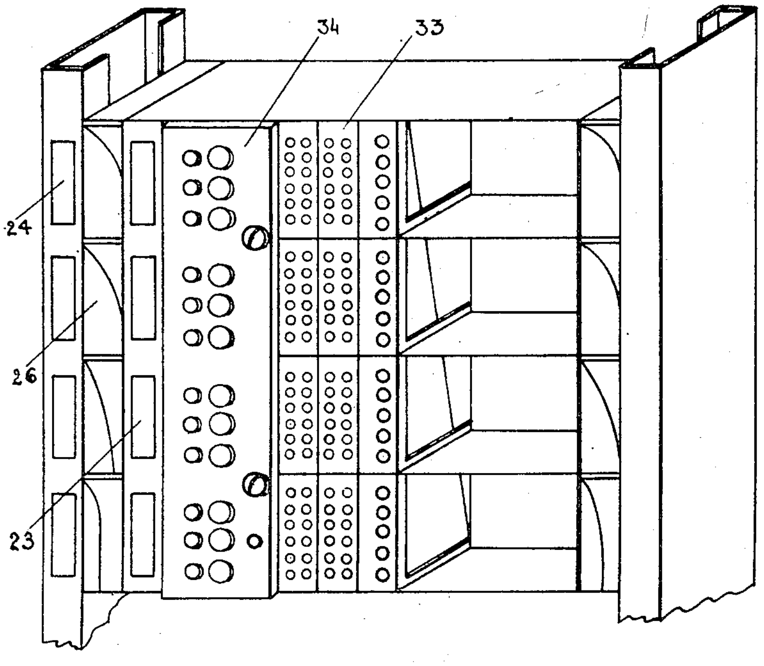

Fig. 9 shows a general view of a cable termination on the trunk circuit side.

Figure 10:
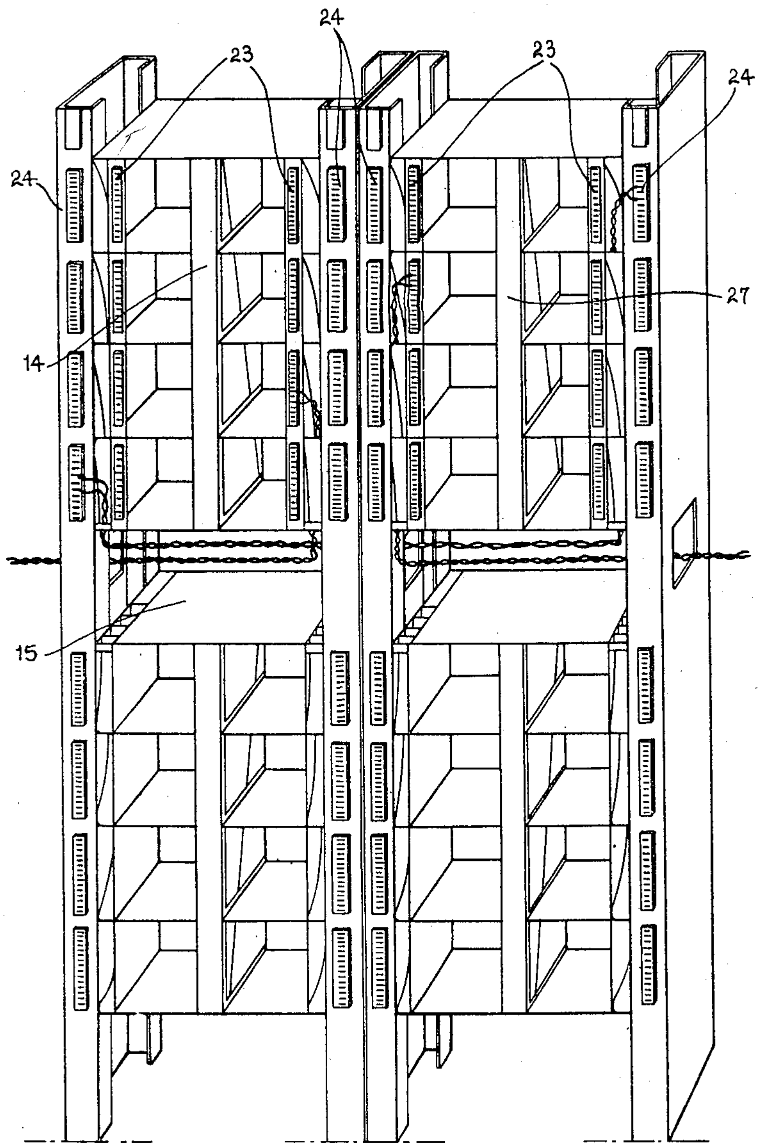

Fig. 10 shows part of two bays of one rack, with distributing connectors.

Figure 11:
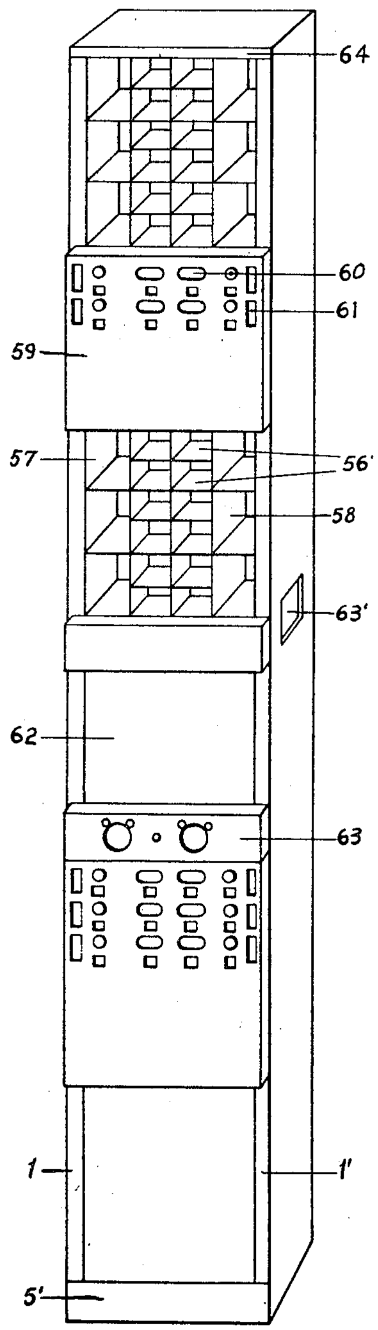

Fig. 11 shows a bay for equipment intended for the supply of carrier currents with echeloned frequencies used for voice frequency telegraphy.

Fig. 12 shows a portion of the bay for carrier current supply with the distribution to blocks.

Figure 1:
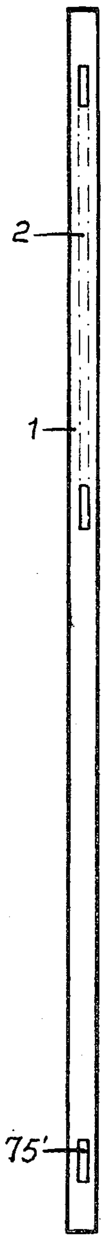
Figs. 1, 2, 3 illustrate in front and side elevation and cross section respectively, a column according to the invention.
Figure 2:
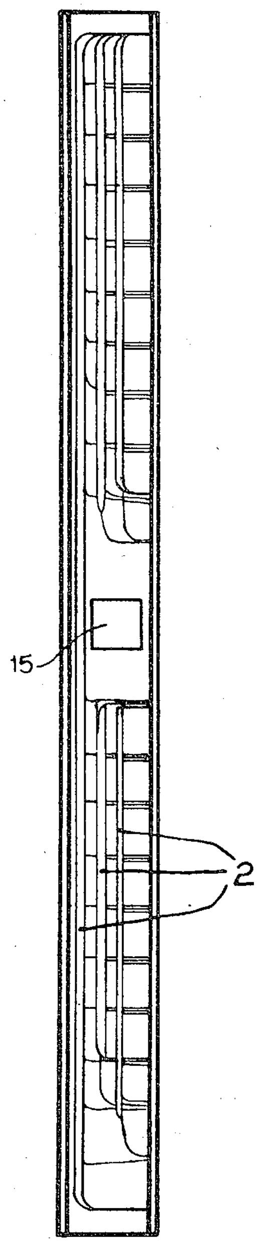
Figure 3:
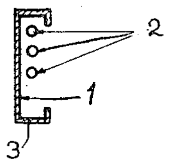

According to the present invention, the frame of a rack is constituted by vertical and parallel columns 1 (see Figs. 1, 2, 3), two adjacent columns forming a bay in which are fixed the cellular frames, or set of compartmented shelves cell 4 (Fig. 4) to receive the blocks of apparatus.

Each column 1 is of iron of channel section, of the profile in common use for telecommunication material (Fig. 3) and encloses a special cabling, located in the channel. This cabling contains connectors corresponding to the sundry components arranged in the adjacent bay. The cabling terminates, according to the connections to be established, in strips of tags and/or of sockets on the front face, 3, of the columns (Figs. 6 and 7). A particular embodiment of a bay according to the invention will be described with reference to Fig. 5.

The column, with its cabling, forms an assembly without any projecting parts and can be easily transported. All the columns of a rack can be put side by side in a same packing case.

Figure 4:
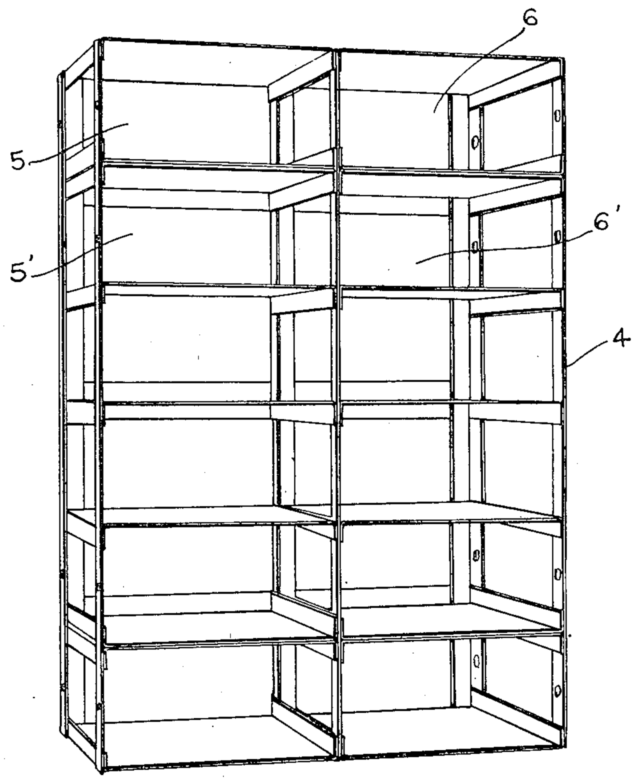
Fig. 4 illustrates a set of compartmental shelves.

The set of shelves are made, as shown in Fig. 4, of folded and welded sheet iron, forming two parallel rows of cells, 5, 5' . . . 6, 6' . . . vertically aligned, in which the individual blocks are placed. These shelves are screwed to the columns when racks are erected in the station to be equipped.

The blocks are all of the same size: they bear strips of tags or terminals and/or of sockets connected either by short soldered wires, either by U-shaped connectors with the strips of tags or of sockets of the columns.

The four columns 1, 1', 1'', 1''' of Fig. 5 form two bays in a rack: the left bay is equipped with two wire-repeaters of the "intermediate" type, that is to say inserted between two long distance underground cables and the right bay is equipped with two wire-repeaters of the "terminal" type, that is to say inserted between a long distance underground cable and a local junction.

In their general arrangement, these bays include, on each side of a free central runway ending in apertures 15 made in the side faces of the columns 1, first two sets of shelves A, A', containing the general apparatus which have each to serve several circuits (for instance the transformers and balancing networks, each group having to serve the three circuits of a quad) and also the sets of shelves B, C, and B', C', containing the apparatus which each serves one of the quad circuits, such as amplifiers, relays and the like. All these sets of shelves are supported by a base S.

In the left hand bay, equipped with intermediate repeaters as well as in the right hand bay equipped with terminal repeaters, the repeaters are assembled in two symmetrical blocks 7, 8, each corresponding to one direction of amplification, and set in the cells 5, 6 of the shelves 4 (Fig. 4).

The blocks are normally covered with cover plates 9, one cover being removed in figure to show the blocks. The valves sheltered by a protective screen 10 and the U-shaped connecting members 11, project beyond the plane of the covers, as shown in Fig. 6.

The covers 9, fixed to the columns by suitable catches, bear on the shoulders of the U-shaped connecting members 11 and thereby hold the blocks 7, 8 in the cells. The projecting portion of the U-shaped connecting members contains branch sockets 12 for the telephone connections. In addition, apertures 13 in the covers give access to the contacts for the measurement of the anode current of the valves.

The bay for the intermediate repeaters (left bay in Fig. 5) has been shown by way of example, with an equipment for the service of eight quads or twenty-four circuits. The cable terminations in 14, are built in removable casings bearing contact sockets on their front face. Single ended cable grips are connected with these sockets inside the casings: these grips are lead covered quads enclosed during assembly in the hollow columns 1, 1' . . . of the bay, to be connected with the underground cables terminating on top or at the base of the rack.

The blocks containing the apparatus, which have each to serve several circuits, and particularly the transformers and balancing network units, are disposed on both sides of these cable terminations in the cells 5, 6, as shown in Figs. 6 and 7 which are described hereafter.

It is possible to apply the arrangement according to the present invention in stations in which the cables terminate on cable support racks and pass through a main distribution frame. The cable terminations are then connected with the strips of the distribution frame instead of being connected directly with the underground cables.

The bay includes in addition, on both sides of the cells containing the apparatus serving more than one circuit, a runway 15 for connections between racks inside the bay, these connections being carried through as shown in Fig. 10, and includes also, under the sets of shelves a fuse panel 16 bearing the fuses for the direct current supply (anode voltage and relays voltage).

Telephone instrument 77 is fixed on a plate 15' hinged at 76 to cover the runway.

The base 75 contains a fuse panel bearing the fuses for the alternating supply (filament and ringing currents). In the case of an A. C. power supply, the base contains the supply rectifiers and transformers. For a D. C. supply, the leading-in cables end on two strips mounted on the fuse panel and connected through soldered wires with two identical strips 75' disposed in the base of the columns.

In the example of Fig. 5, the bay has the normal height of the racks actually used in stations and is equipped with twenty-four repeaters for eight quads.

The block 17 (Fig. 7) corresponding to a quad of the cable is connected with the sockets of the cable termination 14 by a joint block 18 which consists of a casing equipped with contact tags suitably interconnected inside the casing. The block 17 comprising a casing a part of which is for the three differential transformers of the quad, arranged in cases 19 (Fig. 8), and another part for the three balancing networks 20. These balancing networks are contained in removable casings and can be connected to contact pins 21, the required balancing elements being selected by choosing the particular tags 22 to which sockets on 20 (not seen in the drawings) receiving the pins are connected on their output side, the transformers and balancing networks terminate in strips 23 fixed on the side of the block 17: opposite these strips 23 are other strips 24, on the columns 1, 1', in which the repeaters 7, 8, terminate. Connections between the strips 23 and 24 are made by short soldered wires 25. Between the strips 23 and 24 there is provided a vertical runway 26 for flexible connections, or jumpers, coming from the runway 15, which have to be soldered to the strip 23 or 24.

In the right hand bay, in Fig. 5, which is a bay of two wire terminal repeaters, are two cable terminations 27 terminating in the right half, the underground trunk cable, and in the left half, the cable to the trunk exchange. The blocks of transformers and balancing networks are arranged in cells such as $5_1$. The left hand cells, such as $6_1$ contain fixed balancing networks and if required transformers. They can, in addition, accommodate a testing and signalling panel 34 (Fig. 9).

This panel includes push-buttons 78 and signal lamps 79 allowing:

(*a*) For ascertaining if a line is in use or not;

(*b*) For indicating that one is being taken in use.

As appears from the above description, the rule followed in the design of a bay is to assemble vertically all the apparatus belonging to one circuit, this being made possible by the simultaneous use of cable terminations and of cable forms in the columns. Thus, all the apparatus necessary for a two-wire amplified circuit can be found in the bays of Fig. 5, namely cable distribution terminals, transformer units, balancing network units, repeaters and accessories such as safety fuses and telephone. In the case of the terminal bay which has been described, the functions of the disconnecting cable and the facilities arising from it are offered by the telephone and the insertion of suitable plugs in the sockets 33 of the cable terminations 27.

The result is that, as all the connections from one cable termination to another are made within the bay, there are no external telephone cables between the bays.

None the less, an arrangement as shown in Fig. 10, fulfills the function of the main distribution frame.

That function is to make possible the connection of any two underground circuits coming from different cables through a repeater. It is carried out as follows: the ends of the underground circuits coming from the cables through the terminations 14 and allotted to the various bays of the rack terminate, after passing through the transformers, on the strips 23, whilst the input terminals of the repeaters are connected with the strips 24. When the ends of the circuits to be connected are in the same bay, the necessary connections are carried on by soldering directly two groups of short wires 25 (Figure 7) between the proper tags of the strips 23, 24. If these ends are in two different bays, the first for instance, on the left hand bay of Fig. 10 and the other on the right hand bay, the necessary connections are made by soldering of a jumper to the tags 23 of the left hand bay and the tags 24 of the right hand bay, the jumper passing through the vertical runway 26 reserved for that purpose between the columns and the cells containing the balancing networks and through the jumper runway 15.

The bay shown in Fig. 11 is equipped with apparatus for supplying carrier currents of echeloned frequencies as used for voice frequency telegraphy: the equipment has been arranged according to the present invention although the cable forms in the columns has not been illustrated. In this bay the two columns are 1, 1'.

A unit of three blocks supplies each carrier current: two blocks are identical (not shown, but placed in the cells 56), and contain the oscillators, one in use, the other one as a reserve; a block 57 contains an amplifier with a double connection and a switching device which automatically brings the reserve oscillator into action when the first one fails. The cases of the set of shelves are each divided in two cells by a vertical partition 58, so that amplifier and oscillator blocks are set side by side, one of the cells being further divided into two cells 56 by a horizontal wall.

Covers 59 shut in the blocks, but there are apertures in them for the valves with their screen 60 and for the U links 61.

There is a control panel in 62, and a fuse panel in 63. A runway for connections from bay to bay within the rack is provided at 63'.

The columns 1, 1' carry the various connecting strips and are cabled as above explained. Strips for the carrier current can be placed, either at the upper part, as shown, either at the lower part, or near the runway 63'.

Fig. 12 shows a part of a bay equipped with apparatus for the supply of carrier currents for a twelve channel telephone system and illustrates particularly an arrangement of connections between the blocks which is very convenient in some cases as it very much simplifies the cabling.

The blocks 65, 66 are arranged in a double alignment of vertical cells, without cable terminations between the cells: instead, the columns 1, 1' are equipped with strips of sockets 67 disposed opposite corresponding strips on the blocks.

The blocks 65, 66 contain the suitable filters for each frequency produced and amplifiers are set behind these blocks.

Since there might be undesirable couplings between the incoming circuit of the component harmonics and the filtered frequencies circuit, if they were too close to the strips of sockets 67, 68, which might impair the purity of the carrier currents, the blocks are connected by means of tags 69 on their front faces, preferably located in the middle part of the bay, and wires 70 inside the blocks. To join the blocks in parallel, the tags up adjacent blocks are connected by short wires 71 which do not pass through the columns 4, 4' and the strips 67, 68.

What I claim is:

1. A rack for telecommunication station and exchange equipment comprising a plurality of adjacent vertical cellular structures each of which corresponds to a number of telephone circuits and consists of two spaced vertically extending columns of substantially rectangular cross-section, one aperture in the outer wall of each of said columns intermediate the top and bottom thereof, strips of sockets and strips of terminals on the front face of said columns, cable runs in said columns for connecting together sockets and terminal of said strips situated at different levels, a first set of chassis cells having adjacent each of its sidewalls a vertically extending runway and inserted between the two columns, a second set of chassis cells having adjacent each of its sidewalls a vertically extending runway and inserted between the two columns, the said first and second sets of chassis cells being detachably fixed to said two columns in spaced relation to each other to bound with the apertures in the columns an horizontal runway into which merge the said vertically extending runways, one flat hollow box in the vertical median plane of each of said first and second sets of chassis cells, the said hollow boxes being provided at their front faces with pairs of contact sockets, each of said socket pairs corresponding to one of said circuits, strips of terminals on the front faces of the sidewalls of the said first and second sets of chassis cells, a series of blocks containing the apparatus belonging to each of said circuits respectively, the blocks belonging to the same circuit being mounted in cells of distinct cellular structures of the rack, contact sockets on said blocks along the side edges thereof in front of the contact sockets of the cable heads, strips of terminals on said blocks along the side edges thereof in front of the vertical runways of the chassis cells, U-shaped connecting members between the sockets on the blocks and the sockets on the cable heads, connectors between the strips of terminals on said blocks and the strips of terminals on the front faces of the sidewalls of the said sets of chassis cells and jumpers disposed in the horizontal runway and having it ends engaged in vertical runways of said distinct cellular structures whereby the circuits are connected to the corresponding apparatus and the apparatus of a same series of blocks are connected to each other.

2. A rack for telecommunication and exchange equipment comprising a plurality of adjacent vertical cellular structures each of which corresponds to a number of telephone circuits and consists of two spaced apart vertically extending columns of substantially rectangular cross-section, one aperture in the outer wall of each of said columns intermediate the top and bottom thereof, strips of sockets and strips of terminals on the front face of said columns, cable runs in each of said hollow columns for connecting together sockets and terminals of said strips situated at different levels, a first set of chassis cells having adjacent each of its sidewalls a vertically extending runway, partitions in said vertical runway for dividing it in depth in a number of vertical open channels equal to the number of the horizontal rows of cells of the corresponding chassis, the said channels merging all by one of their ends at the bottom of said first chassis while the other ends merge at the front face of said first chassis, at the levels of the successive cells thereof, a second set of chassis cells having adjacent it sidewalls a vertically extending runway and inserted between the two columns, partitions in said last named runway for dividing it in depth in a number of vertical open channels equal to the number of the horizontal rows of cells of the corresponding chassis, the said second named number of vertical channels merging all by one of their ends at the top of said second chassis while the other ends merge at the front face of said second chassis, at the levels of the successive cells thereof, the said first and second chassis being detachably fixed to said two columns in spaced relation to each other to bound with the apertures in the columns an horizontal runway into which merge the said vertical channels, one flat hollow box in the vertical median plane of each of said chassis cells, the said hollow boxes being provided at their front faces with pairs of contact sockets, each of said sockets pairs corresponding to one of said telephone circuits, strips of terminals on the front face of the sidewall of the said first and second chassis cells, a series of blocks containing the apparatus belonging to each of said circuits respectively, the blocks belonging to the same circuit being mounted in cells of distinct cellular structures of the rack, strips of terminals on said blocks along the side edges thereof in front of the vertical runways of the chassis cells, U-shaped connecting members between the sockets on the blocks and the sockets on the cable heads, connectors between the strips of terminals on said blocks and the strips of terminals on the front faces of the sidewalls of the said sets of chassis cells and jumpers disposed in the horizontal runway and having it ends engaged in vertical runways of said distinct cellular structures whereby the circuits are connected to the corresponding apparatus and the apparatus of a same series of blocks are connected to each other.

3. A rack according to claim 2 in which the horizontal runway in each cellular structure is placed half way up the hollow columns and in which the blocks inserted in the cells of the said first and second sets of chassis include transformers and balancing networks, the said rack further comprising in each cellular structure, above and below the said first and second sets of chassis cells, a number of supplemental chassis having cells arranged in two columns, blocks of repeaters arranged in said cells, sockets on said blocks of repeaters along the sides thereof, in front of the strips of sockets on the front face of said hollow columns, U-shaped connecting elements between said sockets on the blocks of repeaters and the sockets on the hollow columns, whereby the circuits are connected to the corresponding transformers, the balancing networks and the repeaters.

4. A rack according to claim 2 in which the front face of the horizontal runway in each cellular structure is closed by a cover hingedly carried by one of the hollow columns and carrying a telephone connectable with the circuits served by the corresponding cellular structure.

5. A rack according to claim 2 for components supplying carrier currents of echeloned frequencies for voice frequency in telegraphy, in which each of the cells of a chassis of one at least of the vertical cellular structure is divided by a vertical partition into two parts and in which one of said parts is in turn divided by a horizontal partition into two compartments into each of which is insertable an oscillator, while a double channel amplifier is inserted into the other of said parts, the rack further comprising a change over switch, whereby one of the oscillators may be substituted for the other.

6. A rack according to claim 2 in which one at least of the vertical cellular structures is equipped with components supplying carrier currents for twelve channel system, the said vertical cellular structure comprising a supplemental chassis having two adjacent vertical rows of cells, apparatus blocks in said cells, strips of terminals on the front face of the blocks at their adjacent edges connecting wires inside the blocks for connecting together at least two terminals of a same strip and soldered wires connecting terminals of adjacent blocks, whereby the various blocks are connected in parallel.

References Cited in the file of this patent

UNITED STATES PATENTS

| | | |
|---|---|---|
| 2,065,897 | Kenner et al. | Dec. 29, 1936 |
| 2,103,501 | Waldron et al. | Dec. 28, 1937 |
| 2,512,908 | Arndt | June 27, 1950 |

FOREIGN PATENTS

| | | |
|---|---|---|
| 960,691 | France | Nov. 7, 1949 |